US009869298B2

(12) United States Patent
Rosenvard et al.

(10) Patent No.: US 9,869,298 B2
(45) Date of Patent: Jan. 16, 2018

(54) ROTATIONAL POSITIONING SYSTEM IN A WIND TURBINE

(75) Inventors: Paw Rosenvard, Gjern (DK); Michele Lucente, Aarhus N (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 1407 days.

(21) Appl. No.: 13/807,517

(22) PCT Filed: Jun. 24, 2011

(86) PCT No.: PCT/DK2011/050235
§ 371 (c)(1),
(2), (4) Date: Dec. 28, 2012

(87) PCT Pub. No.: WO2012/000504
PCT Pub. Date: Jan. 5, 2012

(65) Prior Publication Data
US 2013/0115043 A1 May 9, 2013

Related U.S. Application Data

(60) Provisional application No. 61/359,576, filed on Jun. 29, 2010.

(30) Foreign Application Priority Data

Jun. 29, 2010 (DK) .................. 2010 00565

(51) Int. Cl.
F03D 7/04 (2006.01)
F03D 7/02 (2006.01)
F03D 17/00 (2016.01)

(52) U.S. Cl.
CPC ............. F03D 7/04 (2013.01); F03D 7/0204 (2013.01); F03D 7/0224 (2013.01); F03D 17/00 (2016.05);
(Continued)

(58) Field of Classification Search
CPC ........ F03D 7/0204; F03D 7/0224; F03D 7/04; F03D 17/00; F05B 2270/331; F05B 2270/602; F03B 2270/335; Y02E 10/723
See application file for complete search history.

(56) References Cited

U.S. PATENT DOCUMENTS 5,278,773 A    1/1994  Cousineau
5,422,826 A *  6/1995  Cousineau ............ F03D 7/0204
                                                            416/36

(Continued)

FOREIGN PATENT DOCUMENTS

EP    2037119 A1    3/2009
EP    2189656 A2    5/2010

*Primary Examiner* — Igor Kershteyn
(74) *Attorney, Agent, or Firm* — Patterson + Sheridan, LLP

(57) ABSTRACT

A rotational positioning system in a wind turbine is provided that comprises a driven part, a plurality of positioning drives coupled to the driven part, a plurality of sensors each arranged to sense a load parameter indicative of the load of the respective positioning drive, and a load controller connected to the plurality of sensors. The load controller is arranged to determine a load of a respective positioning drive based on the sensed load parameter, to compare said load with an expected load value, and to output a signal indicative of a failure of the respective positioning drive in response to the load being smaller than the expected load value.

14 Claims, 4 Drawing Sheets

(52) U.S. Cl.
CPC ... *F05B 2270/331* (2013.01); *F05B 2270/335* (2013.01); *F05B 2270/602* (2013.01); *Y02E 10/723* (2013.01)

(56) References Cited

U.S. PATENT DOCUMENTS

| | | | |
|---|---|---|---|
| 6,566,764 B2* | 5/2003 | Rebsdorf | H02P 9/007 290/44 |
| 7,944,067 B2* | 5/2011 | Kammer | F03D 7/0224 290/44 |
| 2003/0160456 A1 | 8/2003 | Wobben | |

* cited by examiner

ROTATIONAL POSITIONING SYSTEM IN A WIND TURBINE

FIELD OF THE INVENTION

The invention relates to a rotational positioning system in a wind turbine, and more particular to a rotational positioning system for the wind turbine yaw system.

DESCRIPTION OF THE RELATED ART

A wind turbine according to the state of the art is described in WO 2009/068036 A2. For yaw control, the same comprises a yaw mechanism with one or more yaw motors, i.e. rotational positioning drives, and a yaw bearing, which forms a rotatable connection between the wind turbine tower and the nacelle. The yaw motor or motors are cooperating with a toothed ring fixedly connected to the top of the tower, by a pinion gear. Other wind turbine yawing systems are known from EP 1 571 334 A1 or from WO 2008/053017 A3.

Further, it is known from DE 37 22 022 C1 to use a rotational positioning drive in a wind turbine, e.g. for pitch control of the rotor blades, wherein two separate motors are coupled to the element to be positioned, i.e. the wind turbine blade, by means of a differential gear. The motors are coupled to the differential gear by respective worm gears, the latter having self-inhibiting effects for the motors when not energized.

In US 2003/160456 A1 an azimuth drive for wind energy plants, i.e. a wind turbine yaw system, includes a plurality of three-phase asynchronous motors, which are energized by a three-phase current of variable frequency and which are coupled in a negative feedback relationship by means of a current transformer for electrically stabilizing the individual motors from unwanted torque fluctuations in the same.

SUMMARY OF THE INVENTION

According to a first aspect the invention provides for a rotational positioning system in a wind turbine. The rotational positioning system comprises a driven part, a plurality of positioning drives coupled to the driven part, a plurality of sensors each arranged to sense a load parameter indicative of the load of the respective positioning drive, and a load controller connected to the plurality of sensors. The load controller is arranged to determine a load of a respective positioning drive based on the sensed load parameter, to compare said load with an expected load value, and to output a signal indicative of a failure of the respective positioning drive in response to the load being smaller than the expected load value.

According to a second aspect the invention provides for a method of rotationally positioning a driven part in a wind turbine. The driven part is driven by means of a plurality of positioning drives. A load parameter indicative of the load of a respective positioning drive is sensed. A load of a respective positioning drive is determined based on the sensed load parameter. Said load is compared with an expected load value. A signal indicative of a failure of the respective positioning drive is outputted in response to the load being smaller than the expected load value.

BRIEF DESCRIPTION OF THE DRAWINGS

Embodiments of the present invention are explained by way of example with respect to the accompanying drawings, in which.

DETAILED DESCRIPTION OF EMBODIMENTS

Figure 1:
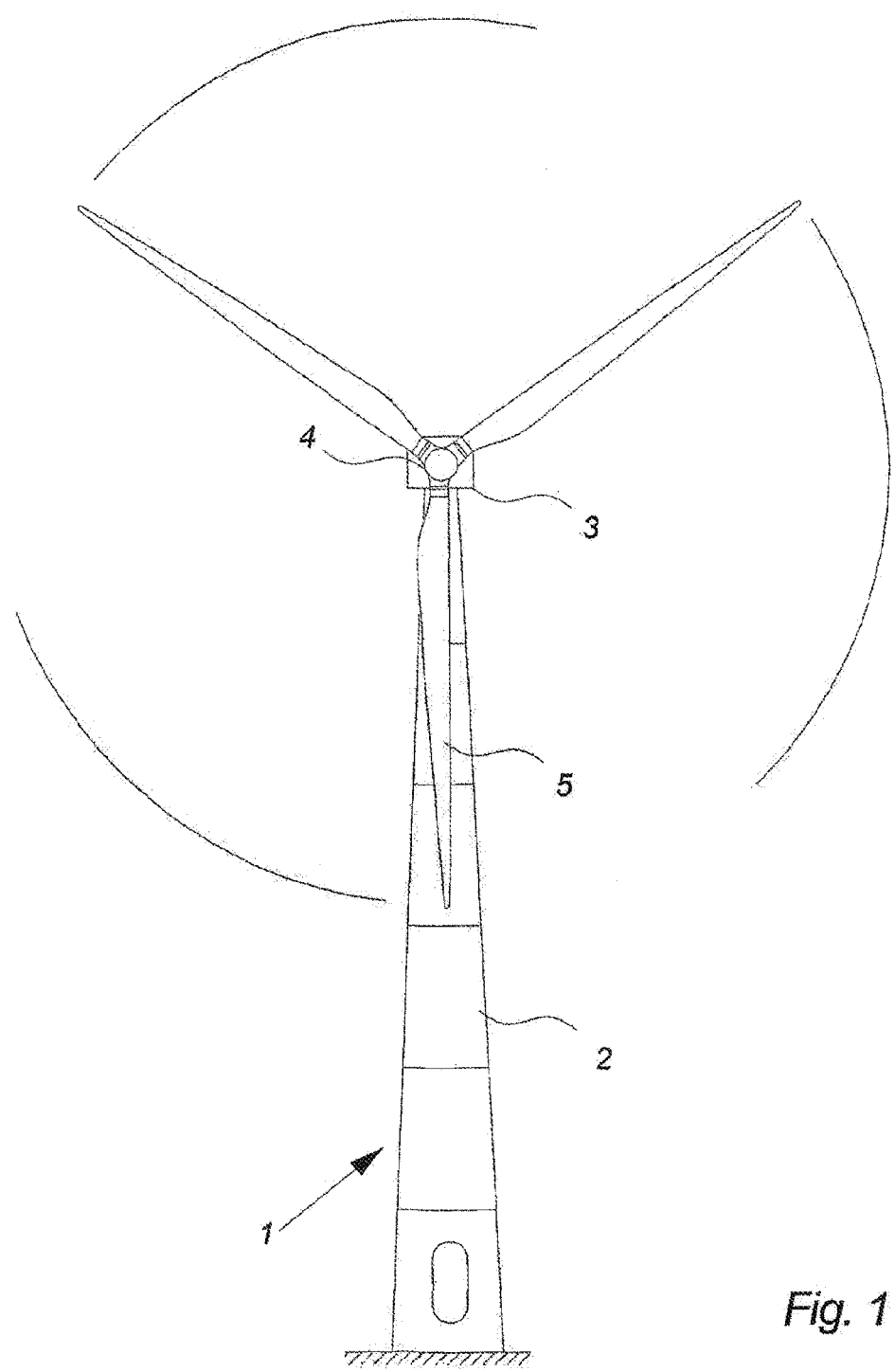
FIG. 1 illustrates a large modern wind turbine according to the state of the art, as seen from the front.

FIG. 1 is illustrating a large wind turbine, as indicated generally by reference numeral 1. The wind turbine 1 comprises a tapered tower 2 and a wind turbine nacelle 3, which is positioned on top of the tower 2. A wind turbine rotor 4 with a number of rotor blades 5, in the shown embodiment comprising three wind turbine blades 5, is connected to the nacelle 3 by means of a so-called low speed shaft, which is extending out of the nacelle 3 front, at a rotor hub 14. The wind turbine nacelle 3 is mounted on the top of the tower 2 to be able for azimuthal rotation around a vertical axis, which is called "yawing", so that the nacelle 3 can follow the direction of wind or can be brought in a specially defined, feathered, position of the rotor blades 5 with reference to the wind direction under given circumstances. The wind turbine blades 5 are arranged such that the pitch of each blade 5, i.e. its inclination with respect to the actual wind direction and speed can be adjusted or controlled. A pitch can be kept constant or can be varied during one rotation of the rotor 4, the latter for adapting to the wind speed varying with the distance from the ground. Rotational positioning systems are especially used for a wind turbine yaw control system to control the yaw of the wind turbine nacelle 3 or for a wind turbine pitch control system to control the pitch of the wind turbine blades 5.

Figure 3:
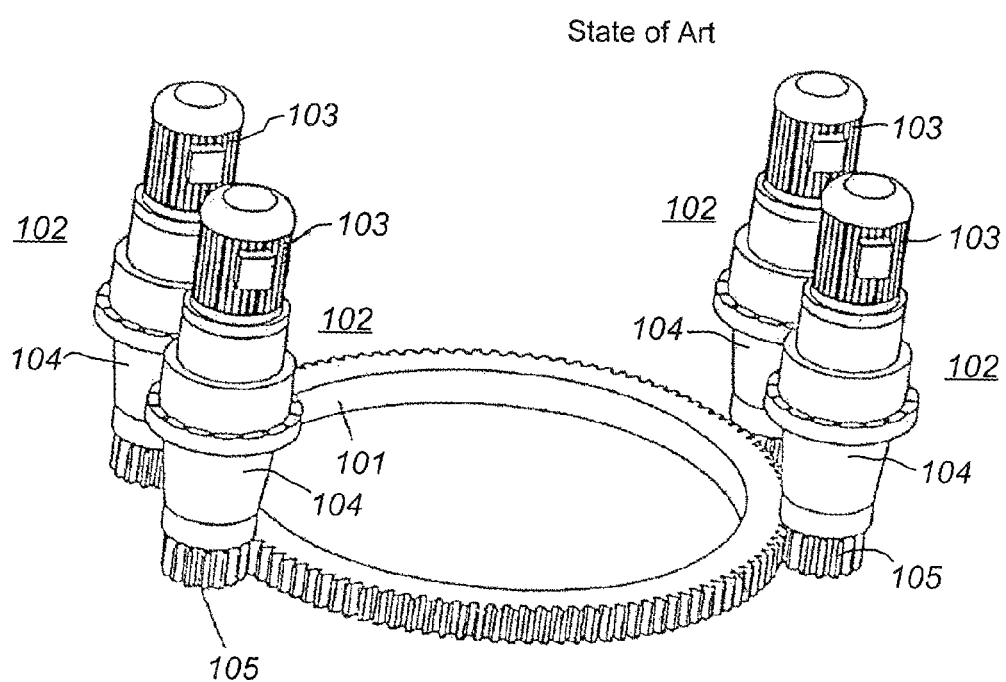
FIG. 3 is a perspective view of a wind turbine yaw system, as known per se in the state of the art.

A wind turbine yaw control system, FIG. 3, as known per se in the art, comprises a plurality of yaw drives 102, each including a yaw motor 103 and a yaw gear 104. Each of the yaw drives 102 should share the load equally, or according to predefined proportions. Due to the extreme high yaw drive requirement, which has to be fulfilled by a proper yawing system to comply with any operating condition of the wind turbine, the yaw drives 102 are normally dimensioned in such way that any overload relay, that typically is included in the yaw system to protect the same from being damaged by excessive loads, under any normal conditions is never closed to setting. This means that any failure of a yaw motor 103 or, generally, the yaw drive 102 in the sense that the same does not contribute to the yawing motion, is not detected. Typically, a yaw motor 103 of a yaw drive is loaded not more than 50% during normal operation, thus motor failure might be not detected even if, theoretically, half the number of yaw motors is defective.

Before proceeding further with a detailed description of the embodiments of the invention, some general aspects of the wind turbine positioning system shall be discussed.

In one embodiment, the rotational positioning system comprises positioning drives that in turn each comprises one (or more) positioning motor and a gear via which the positioning motor(s) is coupled to the driven part. In another embodiment, the positioning drive comprises a positioning motor that is directly (without any intermediate gear) coupled to the driven part. The sensor are thus arranged to sense a load parameter for the positioning motor or the gear, in both cases is the load parameter indicative of the load of the one (or more) positioning motor. In general, the load parameter is sensed for any part of the positioning drive that is subject to the torque transmission from the positioning motor to the driven part provided that this load parameter is indicative of the load applied by the positioning motor. In another embodiment, two or more positioning motors are coupled together by one common gear, such as an differential gear, to the driven part.

In one embodiment the sensors for sensing the load parameter are arranged to sense a load parameter indicative of the effective motor power, in particular an electric motor current, of the respective positioning motor.

Alternatively, or additionally, the sensors are arranged to sense a load parameter indicative of the mechanical torque of the positioning drive. Again, the mechanical torque of the positioning drive may by sensed at any of its parts that is subject to the torque transmission from the positioning motor to the driven part.

In one embodiment, the load controller is arranged to output a signal indicative of failure of the respective positioning drive in response to the load being smaller by more than a predetermined amount than the expected load value.

In one embodiment, the load controller is further arranged to output a signal indicative of failure of the respective positioning drive in response to the load being larger by more than a predetermined amount than the expected load value. Thus, the controller outputs a failure signal for a positioning drive that is not only working below normal load but that is also working a predetermined amount above normal load (such as in a jamming situation).

In one embodiment, the load controller is arranged to compare the load of a respective positioning drive with the expected load value during given operating intervals of the rotational positioning system, and to output a signal indicative of a failure of the positioning drive in response to the load being smaller or higher by a predetermined amount than the expected load value during all or at least a part of the given operating intervals or during all or at least a part of each of the given operating intervals. The operating intervals may be chosen such that normal load distribution to the positioning drives is to be expected during such an operating interval, such as excluding starting and braking intervals. Considering a plurality of such successive operating intervals, such as a number of successive rotational movement operations of the rotational positioning system, minimizes the risk of a misdiagnosis of the failure of a positioning motor. The operating intervals are relatively short, as those of a single positioning operation, or they are longer, as hours, days or weeks, comprising a large number of positioning operations.

In one embodiment, the rotational positioning system is arranged to control the yaw of the wind turbine, in particular the pivotable connection between a wind turbine tower and a wind turbine nacelle. The driven part is a yaw ring, and the positioning drive includes a yaw motor and a pinion meshing with the yaw ring. Again, some or all positioning motors are grouped together into a plurality of motor groups and each motor group is coupled via one gear, such as a differential gear, to the yaw ring. Thereby, only a part or all of the positioning motors of one motor group are equipped with the sensors for sensing the load parameter.

In another embodiment, the rotational positioning system is arranged to control a pitch of the wind turbine blades.

Returning now to FIG. 1, according to one embodiment, the wind turbine rotor 4 comprises three rotor blades 5, which are mounted to the hub 14, but in other embodiments, the wind turbine rotor 4 might comprise another number of blades 5, such as two, four or more blades.

Figure 2:
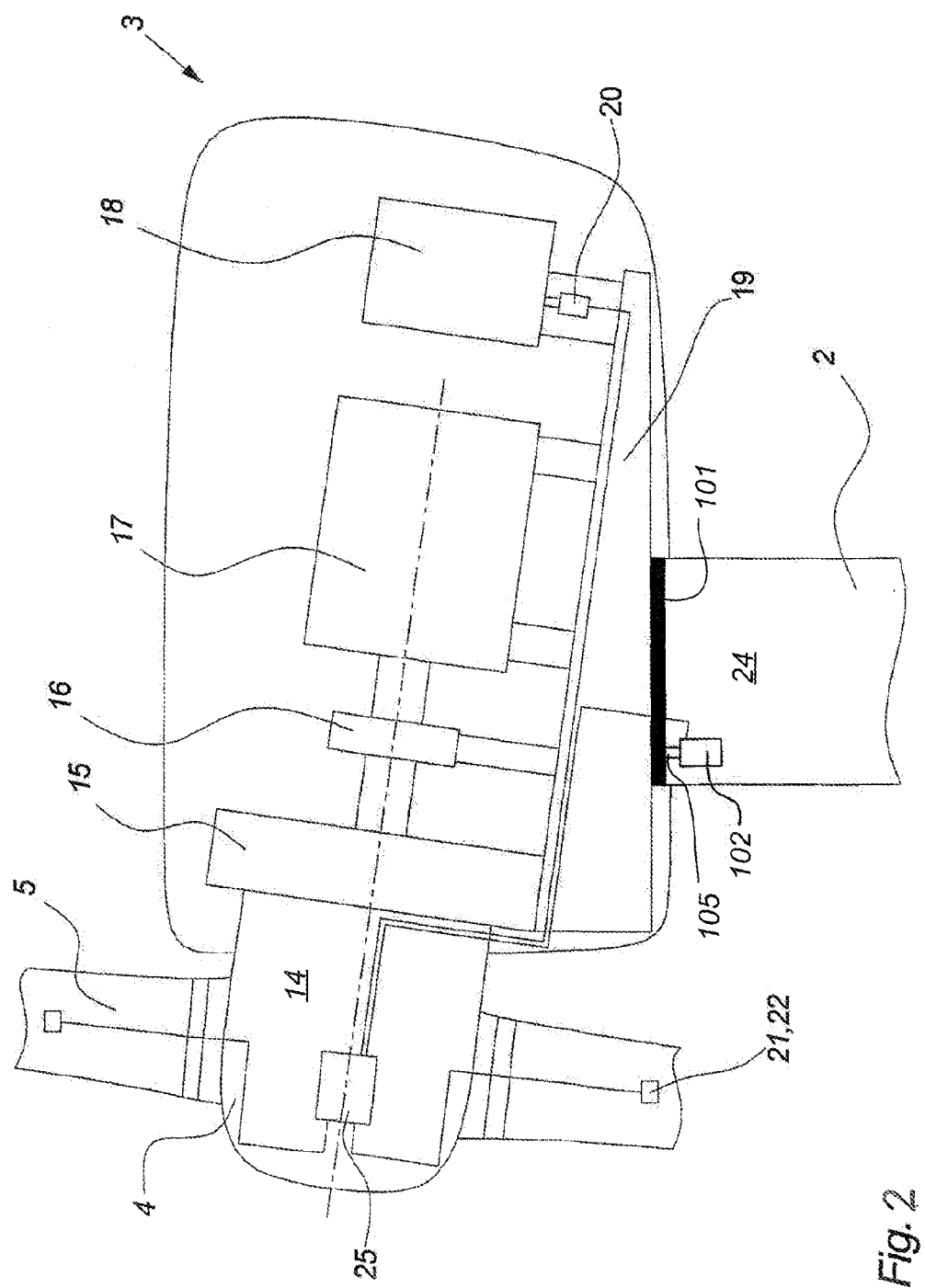
FIG. 2 shows a simplified cross-section of a wind turbine nacelle, as seen from the side.

FIG. 2 is showing a simplified cross-section of the nacelle 3 of a so-called pitch-regulated wind turbine 1, as seen from the side. Nacelles 3 may exist in a multitude of variations and configurations, e.g. a drive train in the nacelle 3, following the low speed shaft to which the wind turbine rotor 4 is fixed, comprises one or more of the following components: a gear 15 for changing the (low) rotational speed of the rotor 4 to an elevated rotational speed, some sort of brake system 16, and a generator 17 for converting the mechanical energy provided from the wind turbine rotor 4 to electrical energy. Further, the nacelle 3 of a modern wind turbine 1 might also include a converter (or inverter) 18 for converting the electrical energy output from the generator 17 to a voltage with appropriate amplitude, frequency and phase for complying with the electrical grid requirements. Further included in the nacelle 3 might be additional peripheral equipment, such as further power handling equipment, control equipment, hydraulic systems, cooling systems and more.

The weight of the entire nacelle 3, including the nacelle components 15, 16, 17, 18, is carried by a strengthening structure 19. The above described components 15, 16, 17, 18 may be placed on and/or connected to such a common load carrying structure 19. In the shown simplified embodiment, the strengthening structure 19 only extends along the bottom of the nacelle 3, e.g. in form of a bed frame, to which some or all the components 15, 16, 17, 18 are connected. In other embodiments, the strengthening structure 19 might comprise a so-called gear bell transferring the load from the rotor 4 directly to the tower 2, or the load carrying structure 19 might comprise several interconnected parts, such as in a lattice work.

In the shown embodiment, the drive train of the nacelle 3 is arranged in an angle relatively to a horizontal plane, e.g. for ensuring that the rotor blades 5 do not hit the tower 2, for compensating for differences in wind speed at the top and the bottom of the wind turbine rotor 4, and other reasons.

Most embodiments of modern wind turbines use so-called forced yawing, i.e. for controlling the direction or orientation of the nacelle 3 and, consequently, the axis of the wind turbine rotor 4, in the azimuth direction around the vertical axis of the tower 2 and, consequently, relative to the wind direction, they make use of a yaw controlling system, which includes a controller 25 and a yaw system 24. The yaw system 24 includes drives 102 to keep the rotor yawed against the wind by rotating the nacelle 3 on the top of the tower 2.

The yaw system 24 shown in FIG. 2 comprises a yaw positioning drive 102 which is cooperating with a toothed ring 101 by means of a pinion gear 105, all those components illustrated in FIG. 2 in a very simplified manner.

The yaw system is activated by the controller 25, which is, only for the purpose of example, in the embodiment of FIG. 2, shown as included in the rotor 4, for controlling the yaw angle or the yaw position, e.g. on the basis of a position feedback signal from a position sensor. Instead of being placed in the hub 14 of the rotor 4, in other embodiments, the controller 25 might be placed in the nacelle 3, in the tower 2, or at another appropriate place.

The wind turbine blades 5 of the rotor 4 are connected to the hub 14 pivotably around the longitudinal axis of the blades 5, i.e. in such a way to enable variation of the blade pitch relatively to the wind. This includes a feathered position, i.e. a parking position, where the blade 5 is pitched so that the chord of the same is substantially parallel with the incoming wind. For protective purposes, if the wind speed of the incoming wind increases above a certain level, such as e.g. 25 meters/sec, the controller 25 will feather the blades 5 to make the rotor 4 stop rotating, or at least make the rotor 4 idle, and the wind turbine will substantially stop producing power to the utility grid. This is, among other reasons, for protecting the blades 5 and the other components of the wind turbine 1 from damaging overloads at high wind speeds. The pitch control of the rotor blades 5 is performed by a pitch control system or pitch positioning drives 21, 22, which in FIG. 2, for the sake of simplicity and as an example only, are shown near the root 29 of the blades 5.

FIG. 3 is showing, in a perspective, simplified view, some essential parts of a wind turbine yaw system, as known per se from the state of the art. This comprises a yaw ring 101 and a plurality of yaw drives 102 each including a yaw motor 103 and a yaw gear 104, wherein the yaw gear 104 of each yaw drive 102 is coupled to the yaw ring 101 by a yaw pinion 105, the latter meshing with the yaw ring 101. Such a yaw system, typically, is provided in the connection between the wind turbine tower 2 and the wind turbine nacelle 3 of a wind turbine, as it is shown at reference numeral 24 in FIG. 2.

Figure 4:
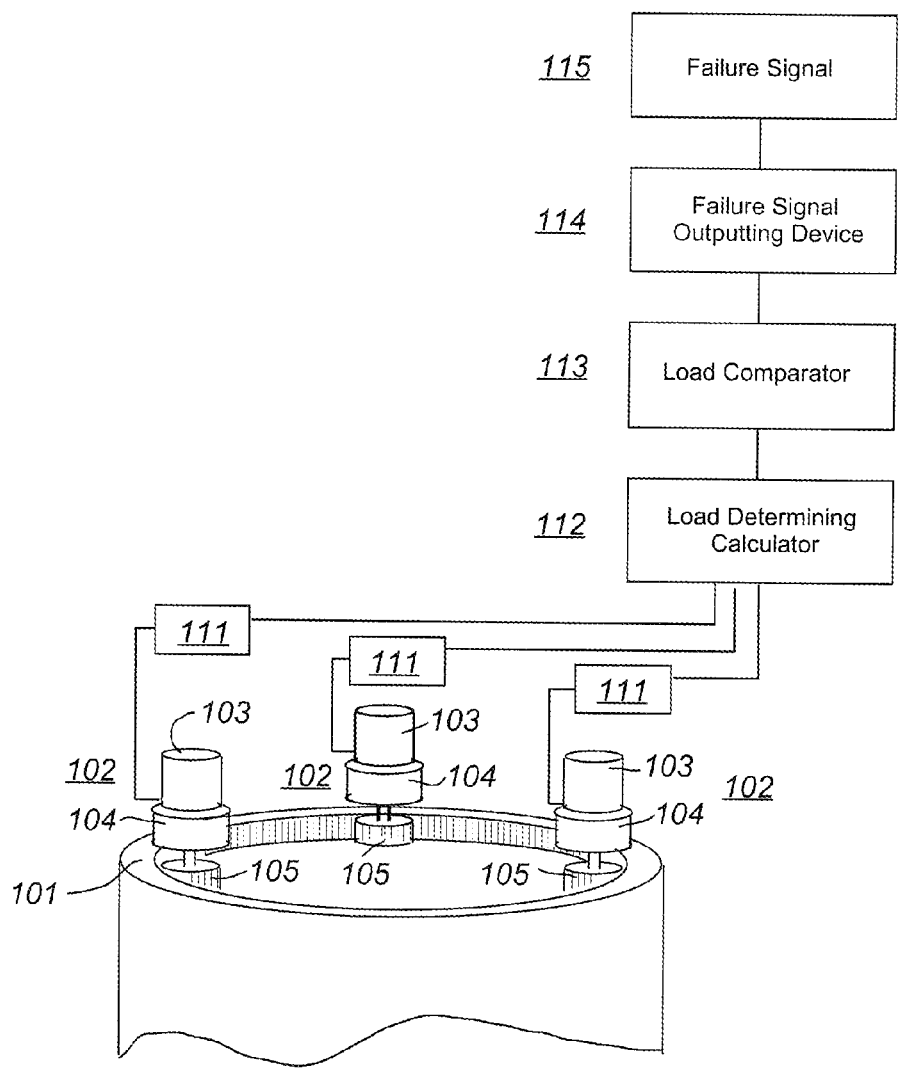
FIG. 4 is a simplified perspective view and schematic block diagram of a wind turbine yaw system according to one embodiment of the invention.

In FIG. 4, one embodiment of the inventive yaw system is shown in a simplified manner, partially in perspective view, partially in form of a block diagram.

The yaw system comprises a yaw ring 101 and a plurality of yaw drives 102 each including a yaw motor 103 and a yaw gear 104, wherein the yaw gear 104 is coupled to the yaw ring 101 by a yaw pinion 105, the latter meshing with the yaw ring 101. Whereas FIG. 3 shows a yaw system, in which the yaw drives 102 are arranged outside of the yaw ring 101, the yaw pinions 105 meshing with teeth of the yaw ring 101 on the outer circumference of the same, in FIG. 4 the yaw drives 102 are arranged inside the yaw ring 101, the yaw pinion 105 meshing with teeth of the yaw ring 101 on the inner circumference of the same, only by the way of an example. Further, FIG. 3 shows an arrangement including four yaw drives 102, whereas in FIG. 4, only for the sake of simplicity, there are shown only three yaw drives 102.

Generally spoken, the yaw system includes a plurality of yaw motors 103 within any kind of yaw drive 102 for driving the yaw system, and a plurality of sensors 111 for sensing a load parameter of a respective yaw motor 103 or, generally, the yaw drive 102. In FIG. 4, here are shown three yaw drives 102, each comprising one yaw motor 103 and one yaw gear 104, the latter meshing with the yaw ring 101 of the yaw system by one yaw pinion 105, each. In the present embodiment, each one of those yaw drives 102 has an associated sensor 111 for sensing the load parameter.

The sensors 11 are coupled to a load controller, which is arranged to perform the following steps, for instance by the components 112, 113, 114, 115 as shown in FIG. 4. In a first step (e.g. performed by calculator 112) it determines a load of a respective yaw motor 103 based on the load parameter sensed by the sensors 111. In a second step (e.g. performed by a comparator 113) it compares this load with an expected load value. In a third step (e.g. performed by an outputting device 114) it outputs a signal 115 indicative of failure of the respective yaw motor in response to the load being smaller than the expected load value. Such an expected load value may be based on the mean load value of the plurality of yaw motors 103 of the yaw system, provided that the yaw motors 103 are similar or identical. In case that, for reasons whatever, there are differences in the yaw drives 102 or yaw motors 103, as regards their power or load carrying ability, such differences are taken in consideration when determining the mean load value.

The sensors 111 can be arranged to sense a load parameter, which is indicative of the effective power of the yaw motors 103, they can be arranged to sense an effective electric motor current of the yaw motors 103 as the load parameter, or the sensors 111 can be arranged to sense a mechanical torque of the yaw motors 103 or, generally, the yaw drives 102 as the load parameter.

The load controller 112, 113, 114, 115 may further be arranged to compare, based on the sensed load parameter, the load of the respective yaw motor 103 with the expected load value, and to additionally output a signal indicative of failure in response to the load being larger by more than a given amount than the expected load value.

Additionally, or alternatively, the load controller 112, 113, 114, 115 may be arranged to compare, based on the sensed load parameter, the load of the respective yaw motor 103 or yaw drive 102 with the expected load value during given operating intervals of the yaw system, and to output the signal indicative of failure, in response to the load being larger than the expected load value during all or at least a part of all the given operating intervals or during all or at least a part of a each the given operating intervals.

Any significant deviation of the sensed load from the expected load value, in the sense of being significantly smaller, but on the other hand also when being significantly larger than the expected load value, may be considered as an indication of failure of one of the elements in the yaw drive 102, be it in the yaw motor 103, the yaw gear 104, the yaw pinion 105 or in any other essential part associated with the respective yaw drive 102. When the detected load, based on the sensed load parameter, is significantly smaller than the expected load value, this can be considered as an indication of malfunction in the sense of reduced driving performance, be it for whatever reason. On the other hand, when the detected load, based on the sensed load parameter, is significantly larger than the expected load value, this might, at a relatively early time, be considered as a malfunction in the sense of any not normal, enhanced power requirement associated with the yaw drive 102, may be by jamming or increased friction in the yaw motor 103, the yaw gear 104 or at another place.

Generally spoken, the sensed load of a respective yaw motor is compared with an expected load value in such way that the effective power consumption or load on each yaw motor is monitored, and if, on this basis, any failure of a yaw motor or yaw drive is detected, e.g. when a motor uses significantly less power than the others, the load controller will detect this, whereas the wind turbine is still able to continue proper operation.

The said comparison of the load, detected based on the sensed load parameter, with the expected load value can be based on any appropriate reference value, this may be the mean load value of the plurality of the remaining yaw motors, the mean load value of all the yaw motors, including the respective one under consideration. The comparison, however, might also be done by deriving the expected load values from the operating parameters of the wind turbine, i.e. by modeling the expected load value from parameters as wind direction, wind speed, rotational speed of the wind turbine, electric power output from the generator, and other operation parameters, or also by deriving the expected load values from a look-up table to which the operating parameters are input. However, the most appropriate way might be a simple comparison with the mean load or power requirement of the other yaw motors.

LIST OF REFERENCE NUMERALS 1 wind turbine
2 tower 3 nacelle
4 rotor
5 blade
14 hub
15 gear
16 breaking system
17 generator
18 converter
19 strengthening structure
21 pitch control system
23 pitch control system
24 yaw system
25 yaw and pitch controller
29 root
101 yaw ring
102 yaw drive
103 yaw motor
104 yaw gear
105 yaw pinion
111 load sensor
112 load determining calculator
113 load comparator
114 failure signal outputting device
115 failure signal

The invention claimed is:

1. A rotational positioning system in a wind turbine, comprising:
   a driven part;
   a plurality of positioning drives coupled to the driven part;
   a plurality of sensors each arranged to sense a load parameter indicative of a load of the respective positioning drive; and
   a load controller connected to the plurality of sensors, and arranged to determine the load of the respective positioning drive based on the sensed load parameter, to compare said load with an expected load value, and to output a signal indicative of a failure of the respective positioning drive in response to the load being smaller than the expected load value.

2. The rotational positioning system of claim 1, wherein the load controller is arranged to determine the expected load value as a mean load value of the plurality of positioning drives.

3. The rotational positioning system of claim 1 or 2, wherein the positioning drives comprise positioning motors, and the sensors are arranged to sense a load parameter indicative of an effective motor power of the respective positioning drive motor.

4. The rotational positioning system of claim 1 or 2, wherein the positioning drives comprise electrical positioning motors, wherein the sensors are arranged to sense a load parameter indicative of an electric motor current of the respective positioning motor.

5. The rotational positioning system of claim 1 or 2, wherein the sensors are arranged to sense a load parameter indicative of a mechanical torque of the respective positioning drive.

6. The rotational positioning system of claim 1, wherein the load controller is arranged to output the signal indicative of the failure of the respective positioning drive in response to the load being smaller by more than a predetermined amount than the expected load value.

7. The rotational positioning system of claim 1, wherein the load controller is arranged to compare the load of the respective positioning drive with the expected load value during given operating intervals of the rotational positioning system, and to output the signal indicative of the failure of the respective positioning drive in response to the load being smaller than the expected load value during all or at least a part of all the given operating intervals or during all or at least a part of each of the given operating intervals.

8. The rotational positioning system of claim 7, wherein the load controller is arranged to additionally output an additional signal indicative of the failure of the respective positioning drive in response to the load being larger by more than a predetermined amount than the expected load value.

9. The rotational positioning system of claim 1, arranged to control yaw of the wind turbine, wherein the driven part is a yaw ring, and the positioning drive comprises a yaw motor and a yaw pinion meshing with the yaw ring.

10. The rotational positioning system of claim 1, arranged to control a pitch of wind turbine blades.

11. A method of rotationally positioning a driven part in a wind turbine, comprising:
    driving the driven part by means of a plurality of positioning drives;
    sensing a load parameter indicative of a load of a respective positioning drive;
    determining the load of the respective positioning drive based on the sensed load parameter;
    comparing said load with an expected load value; and
    outputting a signal indicative of a failure of the respective positioning drive in response to the load being smaller than the expected load value.

12. The method of claim 11, further determining the expected load value as a mean load of the plurality of positioning drives.

13. The method of claim 11, wherein sensing the load parameter comprises sensing a load parameter indicative of an effective motor power of the respective positioning drive.

14. The method of claim 13, wherein sensing the load parameter comprises sensing a load parameter indicative of an electric motor current of the respective positioning drive.

* * * * *